UNITED STATES PATENT OFFICE.

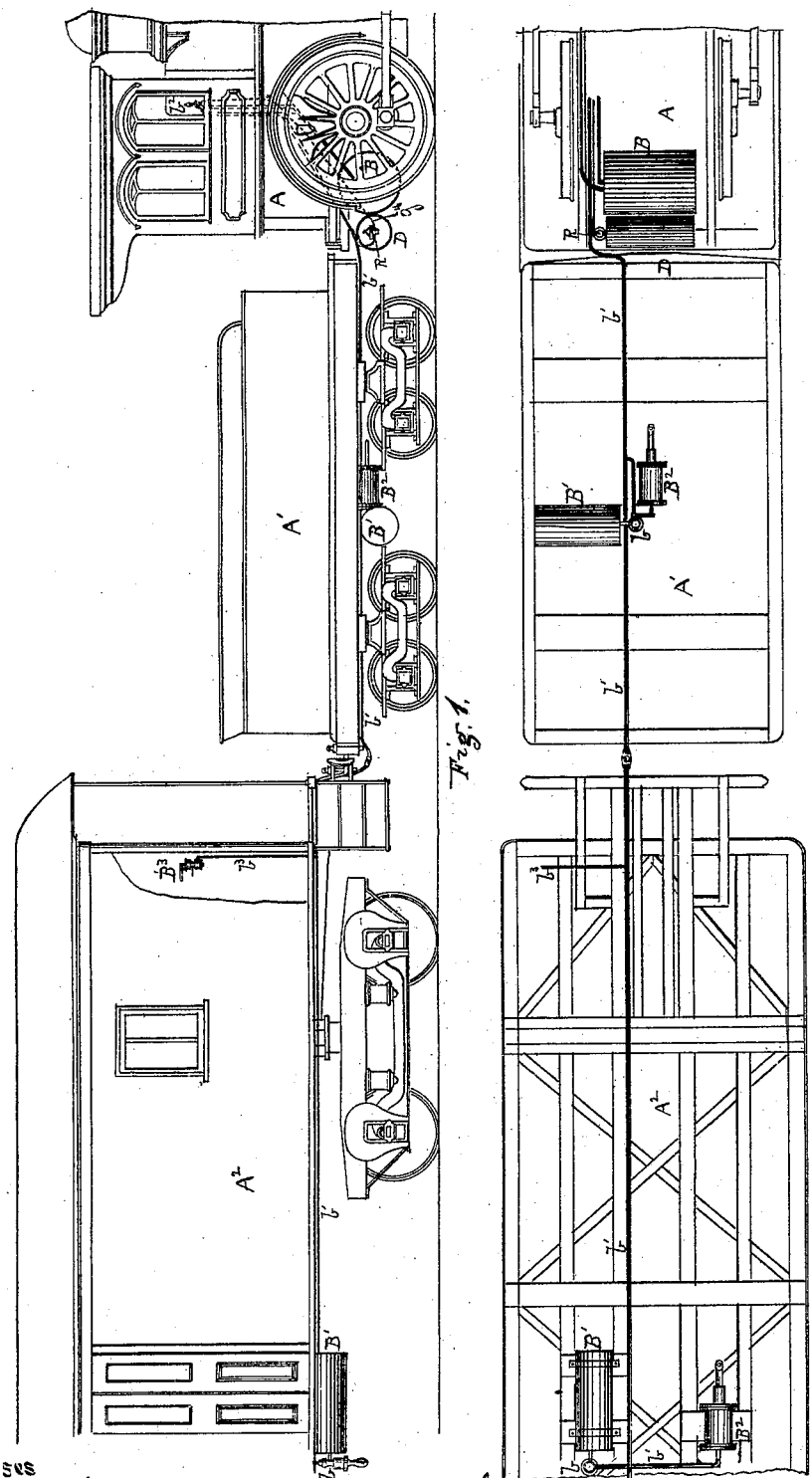
2 Sheets—Sheet 1.
G. WESTINGHOUSE, Jr.
AIR-BRAKE AND SIGNAL.
No. 180,179. Patented July 25, 1876.

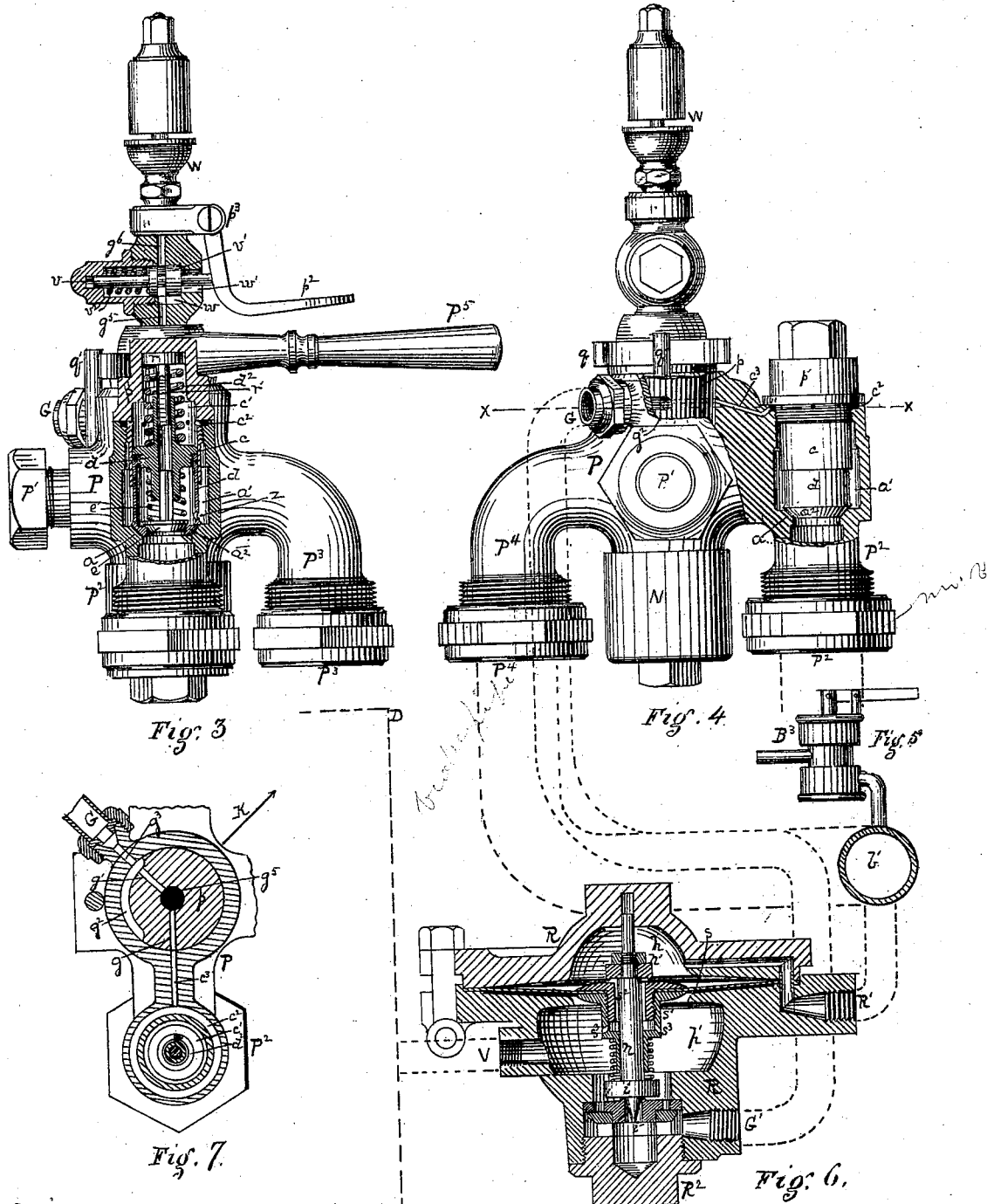

GEORGE WESTINGHOUSE, JR., OF PITTSBURG, PENNSYLVANIA.

IMPROVEMENT IN AIR BRAKES AND SIGNALS.

Specification forming part of Letters Patent No. 180,179, dated July 25, 1876; application filed March 17, 1876.

*To all whom it may concern:*

Be it known that I, GEORGE WESTINGHOUSE, Jr., of Pittsburg, county of Allegheny, State of Pennsylvania, have invented or discovered a new and useful Improvement in Air Brake and Signal; and I do hereby declare the following to be a full, clear, concise, and exact description thereof, reference being had to the accompanying drawings, making a part of this specification, in which—like letters indicating like parts—

Figure 1, Sheet 1, is a side elevation of a portion of a railroad-locomotive tender and car fitted up with my present improvements. Fig. 2 is an inverted plan or bottom view of the same. Fig. 3, Sheet 2, is an enlarged edge elevation, partly in section, of the three-way cock employed. Fig. 4 is a like rear-side elevation, partly in section, of the same. Fig. 5 is an enlarged view of the escape-valve connected with the brake-pipe, in cross-section, for use in signaling. Fig. 6 is a sectional view (enlarged) of the valve device for regulating the flow of air in signaling operations, and Fig. 7 is a sectional view through $x$ $x$ of Fig. 4. Figs. 4, 5, and 6 are connected by dotted lines, representing pipes, &c., the better to illustrate their conjoint operation.

My present invention is primarily designed for use in connection with what is now commonly known as "The Westinghouse Automatic Brake;" but it may be attached to and used advantageously with any fluid-pressure brake in which a fluid-pressure in excess of atmospheric pressure is ordinarily kept up or maintained throughout the train, or on one or more cars. And it may also be employed in signaling operations generally, both in connection with or as a part of stationary apparatus, as also on railway-trains; but its special use being on such trains, this will be first described.

The object of the invention thus considered is to enable the conductor to employ the compressed air or other fluid in communicating signals to the engineer. For purposes of illustration, I have shown, and will describe, the use of a whistle for this purpose, and the manner of its construction and use, in connection with the drawings and description of the other operative parts, assuming compressed air to be the agency employed, and the "automatic" apparatus to be that to which it is to be attached.

A represents the cab and foot-board of a locomotive; $A^1$, the tender; $A^2$, a car. B is the main reservoir on the locomotive. $B^1$ $B^1$ are auxiliary reservoirs, and $B^2$ are brake-cylinders, which are fitted with pistons and with piston-stems, which are connected with the brake-levers. The triple valves employed in the automatic brake are represented at $b$. The brake-pipes and branches $b^1$ are of the usual construction. The position of the three-way cock is shown at $b^2$, Fig. 1. As the brake-pipe contains a column of compressed air, I make use of such column to operate the signaling devices on the locomotive; and for this purpose I make a branch connection, $b^3$, on each car with the brake-pipe, and extend such pipe into the car, or one into each car, so as to be accessible to the conductor, or other employé whose business it may be to give signals, and attach thereto an escape-valve, $B^3$, Figs. 1 and 5. By opening this valve, as the conductor may do at any time, air is allowed to escape from the brake-pipe, and such reduction of pressure causes a port to be opened from a signaling-reservoir on the locomotive to a whistle on the three-way cock. This signaling-reservoir is shown at D in Figs. 1 and 2, and in dotted outline in Fig. 6. A convenient size for it is about ten by twenty-four inches; but it may be made larger or smaller. The larger it is, the less reduction of air-pressure in the brake-pipe is required to work the signal. It may be arranged at any convenient point on the locomotive or tender, or wherever may be convenient with reference to a ready use of its contents. In addition to the valve $B^3$ and reservoir D, I employ the valve device shown in Fig. 6, and also add to the three-way cock a whistle, (shown in Fig. 3,) and in one of the port-connections of the same cock I arrange a valve device. (Shown in Figs. 3 and 4.) These devices I will next describe, taking, first, the three-way cock P, Figs. 3 and 4, the position of which as a part of the apparatus in ordinary use, is shown at $b^2$, Fig. 1. This cock is, by a stem and nut, $P^1$, secured in place. It is (except as hereinafter described) of the usual construction employed in air-braking, with one port-connection, $P^2$, to the main reservoir B on the locomotive, one, $P^3$, opening into the atmosphere, and a third one, $P^4$, communicating with the brake-pipe $b^1$. Compressed air is then transmitted from the main reservoir, through $P^2$ $P^4$ and brake-pipe $b^1$, to charge the auxiliary reservoir $B^1$ and release the brakes, and, in applying the brakes, is permitted to escape from the brake-pipe through $P^3$.

The barrel constituting the port $p^2$ is made with a valve-seat, $a$, Figs. 3 and 4, and above the valve-seat an enlarged chamber, $a^1$, which opens directly into and through the usual ports of the plug $p$, when such ports are brought into line therewith. The upper end of this chamber is closed by a screw-cap, $p^1$, from which a sleeve, $c$, extends down into the chamber $a^1$. This sleeve constitutes a piston-barrel, in which works closely a cylindrical tubular piston, $d$, the lower end $a^2$ of which constitutes what I shall term the "main valve," and seats on the valve-seat $a$. The upper end of this tubular piston $d$ is closed by a head, $d^1$, bored through its axial line, such bore being lengthened out at each end, as shown in Fig. 3. The lower end of the tubular piston $d$ is bored out to form an inside valve-seat, on which I seat a secondary valve, $e$, held down by a light spring, $e'$, and guided by its stem entering the lower end of the bore of the head $d^1$.

The main piston-valve $d$ is held down by a stiff spring, $d^2$, with its upper end bearing against a button, $r$, the stem $r'$ of which enters the upper end of the bore of the head $d^1$. This stem is flattened on one side from its lower to near its upper end, and the stem of the secondary valve $e$ is made of wing or other suitable form, such as will not close entirely the bore in which it plays. The space above the piston-head $d^1$ constitutes a chamber, $c^1$, from which radial ports or holes lead into an annular port, $c^2$, and thence a port, $c^3$, leads to the face of the barrel containing the plug $p$, as in Figs. 4 and 7. The plug has two radial ports, $g$ $g^1$, and a segmental annular port, $g^2$, and a port, $g^3$, Fig. 7, in the barrel opens into a pipe-connection, G, (shown by dotted lines from Figs. 4 to 6, and by the line $g^4$ in Figs. 1 and 2,) which pipe-connection opens into one of the ports of the signaling-valve, presently to be explained.

The radial ports $g$ $g^1$ in the plug $p$ open into a vertical central port, $g^5$, which latter is closed below, but extends upward through the head of the plug, and the continuation of the same port in the whistle W is represented by the same letter in the upper part of Fig. 3. This port $g^5$ opens into a transverse valve-chamber, $w$, closed at one end, and at the other opening into the atmosphere. In this chamber is a valve-stem, $v$, carrying a valve, $v^1$, held in the position shown by a spring, $v^2$, bearing against a collar. The valve $v^1$ then closes the air-escape $w'$, and leaves an uninterrupted passage for the upward flow of compressed air by the port $g^6$ to the whistle W, which may be of any suitable construction, and need not be more fully described. But the outer end of the stem $v$ is in such position as to be engaged by the depression of a thumb-lever, $p^2$, hinged at $p^3$, which lever is in suitable position to be engaged by the thumb or hand of the engineer at the same time that he grasps the cock-handle $P^5$, and as the whistle is screwed into the head of the plug, it is obvious that both the lever and handle can be turned together. The depression of the thumb-lever $p^2$ shifts the valve $v^1$, so as to close the port $g^5$ and open the air-escape through $w'$. The signaling-valve of Fig. 6 is designated generally as R, and its position shown in Figs. 1 and 2. It has a pipe-connection, $R^1$, from the brake-pipe $b^1$, and another pipe-connection, G', already alluded to, with the three-way cock at G. It has also a third connection, V, with a small reservoir, D, already described. This signaling-valve has the general construction of the triple valve used in the automatic brake, and described in patents granted to me, No. 138,827, May 13, 1873, and No. 141,685, August 12, 1873, except that for the present purpose the air-escape port and valve are omitted, and the lower end of the case R R is closed by a screw-cap, $R^2$.

With reference to these patents, the construction of the flexible diaphragm $s$ will be understood, which divides the inclosed space into chambers $h$ $h'$; also the nut $s^1$ at its center, which, sliding upward on the stem $n$, seats against the V-seat on the collar $n'$, but, sliding downward, opens a port, $s^2$, in or around the stem, to the lower chamber $h'$ by the holes $s^3$; also the valve $i$, which, when unseated and lifted up by the nut $s^1$ engaging the collar $n'$, opens the valve-port $i'$, and with a reverse movement closes such port. The ports or passages leading from the connection $R^1$ to the chamber $h$, as also the ports from $h'$ to D and from $i'$ to G', are substantially the same as are described in the patents above referred to.

By the use of this device the signaling-reservoir D is charged with compressed air from the brake-pipe $b^1$, the air passing into $h$; thence, by the unseating of the nut $n'$, through ports $s^2$ $s^3$ into $h'$; thence through V into D. The port $i'$ is at the same time closed. The train is now in running condition, (the auxiliary reservoirs being charged at the same time,) and the signaling apparatus is in condition for use. But before describing this signaling operation I will describe the operation of the valve devices shown in Figs. 3 and 4, in connection with the three-way cock, while the work of charging these reservoirs is going on.

On coupling up to a train the engineer shifts the handle $P^5$, and with it the thumb-lever $p^2$, to the position indicated by the arrow $k$, Fig. 7. The lug $q$ on the head of the plug $p$ then comes against a pin or stop, $q'$, and the ports $c^2$ $c^3$ $g$ $g^1$ $g^2$ $g^3$ are then in communication, and the air-passage through the plug $p$ from the main reservoir to the brake-pipes through $P^2$ $P^4$ is fully opened. The depression of the thumb-lever $p^2$ also keeps the air-escape $w'$ open. The compressed air already stored up in the main reservoir by the compressing-pump then raises both the valves $e$ $a^2$, compressing the springs $e'$ $d^2$, which otherwise would hold them down, and passes through the chamber $a^1$ to the brake-pipe $b^1$, and from it charges the auxiliary reservoirs $B^1$ and the signaling-reservoir D. At the same time any air which may be in the chamber $c^1$ above the piston-head $d^1$, or which may leak therein, is free to escape through the ports and passages $c^2$ $c^3$ $g$ $g^5$ $w'$ to the external air without blowing the whistle. This operation takes but a very short time, say a minute or two. The engineer then changes the position of the plug $p$, say an eighth of an inch, more or less, sufficient to throw the ports $c^3$ and $g$, Fig. 7, out of line, but not sufficient to close the open communication from $P^2$ $P^4$. He then lets go the handle $P^5$ and thumb-lever $p^2$, and the train is in running and signaling condition.

Now, when the conductor, or other person on the train whose duty or privilege it may be to do so, desires to signal the engineer, he opens, just for an instant, an air-escape valve in the valve case $B^3$, or opens and closes it at long or short intervals, according to the number or order of signal whistle-sounds he may desire to give, as by a previously-arranged schedule or system of signals. This allows a little air to escape from the brake-pipe, sufficient to reduce slightly the air-pressure in the chamber $h$, Fig. 6. The air-pressure in the signaling-reservoir D then, acting back through the chamber $h'$ on the under side of the diaphragm $s$, operates, as already set forth, to close the back escape, open the port $i'$, and, by the pipe G' G, pass to and through the ports $g^3$ $g^1$ $g^5$ to the whistle, where the alarm or alarms are sounded, one or more, according as the air is permitted to escape at one or more intervals. As but a very small amount of air is required for this purpose, a sufficient amount can be used without reducing the air-pressure in the brake-pipe sufficiently to shift the triple valves and apply the brakes.

While the valve devices shown in the barrel of the port $P^2$ are not thought to be absolutely essential to the operation of the whistle, as described, they aid materially in insuring the accuracy and certainty of its operation. So slight a reduction of the pressure is required to work the whistle that the air-supply from the main reservoir should not, in order to attain the best results, be allowed to rush in in sufficient quantity to supply such reduction before the whistle can be sounded; and at the same time the air-supply port should always be partially open from the main reservoir to the brake-pipe, in order to supply loss by leakage of the pipes, couplings, joints, and fittings. Hence, I prefer to employ the valve devices shown in Fig. 3 in the barrel of the port $P^2$. As soon as the reservoirs on the cars are properly charged with compressed air the upper spring $d^2$, being made stiff for that purpose, seats the main valve $d$. The air-pressure in the main reservoir, soon coming to be in excess of the air-pressure in the brake-pipes, raises the secondary valve $e$ by compressing its spring $e'$, it being a comparatively light one, and so adjusted or regulated in power that, by the opening and closing of the valve $e$, a difference of air-pressure will be maintained in the main reservoir and brake-pipes of about ten pounds per square inch, more or less. The compressed air thus admitted into the chamber $a^1$ will pass to the brake-pipes through the small port $z$, such port being only about the size necessary to supply the air lost by leakage, though I do not limit myself in this regard. Hence, the air-supply from the main reservoir will be so choked or limited, in the ordinary running of the train, that it will not interfere with the successful operation and use of the whistle. But, in order to balance the head $d^1$ of the piston-valve $d$, so that air-pressure in the chamber $a^1$ shall not raise the main valve $d$, a small amount of such air is permitted to pass up around or between the wings of the stem of the valve $e$, through the bore of the head $d$, along the flattened part of the stem $r'$, into the chamber $c^1$, where its pressure acts on the head $d^1$ downward, so as to balance the upward pressure from below. The upper spring $d^2$ is adjusted or regulated in power so as to be equal to the maximum pressure which it is desired to create in the main reservoir. But it will be observed that when, in first charging the brake-pipes, or in restoring the pressure after the brakes have been applied, (which is done in the manner already described,) the main valve $d$ is raised, the upper end of the bore of the piston-head $d^1$, sliding over the flattened part of the stem $r'$, closes the escape of compressed air in that direction.

The groove $g^2$, Figs. 4 and 7, is of such length that it will always afford an uninterrupted passage for the flow of air in signaling operations, whatever may be the position of the plug $p$; and, as the thumb-lever $p^2$ is never necessarily to be depressed, except for the brief time that the auxiliary reservoirs are being first charged, or, after the brakes have been applied, while they are being recharged, (unless it be to prevent the blowing of the whistle during the instant that the engineer is shifting the handle $P^5$,) it is, for all practical purposes, within the power of the conductor to send signals, in the manner described, at all times, and, by a repetition of such signals, to convey the order or intelligence desired.

Another advantage derived from the use of the valve devices shown, Fig. 3, in the barrel of the port $P^2$ is this: that by keeping up a pressure in the main reservoir a little in excess of that ordinarily maintained in the brake-pipe, I am enabled, by throwing the main valve $d$ wide open, in the manner described, to recharge the brake-pipe and car-reservoirs in less time, and thus release the brakes more quickly. Also, when a train breaks in two, (which would result in the blowing of the whistle and the application of the brakes,) the air-pressure in the main reservoir is not wasted, as it will escape no faster than its loss can be supplied by the pump.

The main feature of the present improvement consists in the mode of operating signals by the difference of air-pressure on opposite sides of a moving diaphragm or piston, since the piston described in patents granted to me October 5, 1875, and January 11, 1876, Nos. 168,359 and 172,064, or other like piston, may be substituted as the mechanical equivalent for the diaphragm $s$, Fig. 6; and this difference of air-pressure may be employed, in the manner substantially as above set forth, to convey signals, either visible or audible, or both, on a railway-train, by substituting other audible or a visible signal for the whistle W; or it may be used on or along a line of railway-track, or in or about a building or other structure, as a fixed apparatus to convey and communicate like signals, with such changes or modifications of structure as can be made by a mechanic skilled in this art; and for the purposes of the present invention a cylinder, piston, and stem, such in construction as is represented at $B^2$, may be employed in lieu of the whistle for the like purpose, the stem having a connection with any suitable semaphore for giving a visible signal. With this modification, however, the signal-valve of Fig. 6 should have an air-escape port, such as is employed in the triple valves represented at $b$, for the purpose of allowing the air to escape from the signaling-cylinder, in order to effect the back or reverse stroke of the piston and the reversal of the semaphore.

The same mode of operation may be employed in connection with automatic vacuum-brakes by interchanging the connections $G'$ and $R^1$ of the signal-valve of Fig. 6. The signal would then be operated by a reverse movement of the air. Other changes to adapt the devices to this operation would involve only the substitution of valves shown in previous patents, and particularly in patent reissue No. 6,948 of February 22, 1876. Other fluid-pressure may be in like manner employed instead of air.

The arrangement, path, and direction of the ports and passages described may be varied somewhat without any substantial departure from the scope of my invention, and all such changes as do not materially affect the function and mode of operation set forth I claim to include as a part thereof.

I have not deemed it necessary to show in detail the construction of the escape-valve $B^3$, as any suitable valve or cock which may be opened by the conductor and closed by him, or closed automatically, may be employed for the purpose, and the construction of cocks capable of performing this function is well known.

It will also be seen that the same mode of operation may be employed in connection with a separate line of pipe leading to the valves $B^3$; but I prefer to employ the column of air in the brake-pipe for the purpose.

With a separate line of pipe, connection may be made from $G'$ direct to the whistle or other signal without going through the plug $p$. The barrel-extension N, Fig. 4, contains a balancing-piston on the lower end of the plug $p$, which, however, is not claimed herein, and for which it is my intention to take a separate patent.

In so far as relates to a moving diaphragm, or equivalent piston, as an element of my invention, it is an essential feature of its construction and operation that there be a communication from one side of such diaphragm or piston to the other side, automatically opened and closed, so that by the use of a single charging and operating pipe an operative fluid-pressure may be brought into action at pleasure on either side of such diaphragm or piston; and in this respect my invention differs from any previous construction or use of similar devices in fluid-pressure signals. Heretofore in such signals fluid-pressure has been employed on one side of a diaphragm or piston to impart to it a movement in one direction, and the weight of the diaphragm or piston and its connections, or an auxiliary weight or a spring, have been employed to effect the reverse stroke; also, it has been proposed to employ a moving diaphragm, with independent and separate charging-pipes, for introducing and exhausting compressed air, alternately and successively, on and from its opposite sides, by an operation substantially such as is involved in the use of an ordinary steam cylinder and piston. To such devices so operating I make no claim.

My mode of operating signals also differs radically from those involved in the operations referred to. In the latter, one side of the diaphragm, at least, is always subject to ordinary atmospheric pressure. In my improved mode of operation, as above described, both sides of the diaphragm or piston are at all times, when the devices are in condition for use, subject to an artificially-created pressure greater or less than atmospheric pressure—greater when compressed air is used, and less when a vacuum, or partial vacuum, is employed.

I claim herein as my invention—

1. The mode of operating signals by means of an artificially-created fluid-pressure acting simultaneously on the opposite sides of a movable diaphragm, or equivalent piston, and capable of variation at pleasure in the force with which it acts on such opposite sides, substantially as set forth.

2. In a signaling-apparatus, the combination of a movable diaphragm, or equivalent piston, subject to difference of air-pressure on its opposite sides, and having an automatically opened and closed communication between such opposite sides, an operating-valve for regulating or changing such pressure, a reservoir or chamber as a magazine for the operative fluid-pressure, and a signal operated by such difference of pressure, substantially as set forth.

3. In combination with the operating-cock of a railway fluid-pressure brake, a signal-whistle arranged thereon, with a system of ports and passages for the supply of fluid-pressure to the whistle, by means of an escape cock or valve accessible to the conductor or other employé, without regard to the position of the operating-cock, substantially as set forth.

4. In combination with a signal-whistle and three-way cock, an intermediate air-escape valve, arranged so as to be capable of being opened by the engineer at the same time and by the same motion as is occupied and employed in the manipulation of the cock in ordinary braking, substantially as set forth.

5. In combination with a continuously-charged brake-pipe, signaling-valve, signaling-reservoir, and signal, an escape-valve, $B^3$, arranged on each of any desired number of cars, with a branch connection from the brake-pipe, substantially as set forth.

6. A signaling-reservoir, signaling-valve, and signal, in combination with the brake-pipe, brake-cylinders, and auxiliary reservoirs of an automatic air-brake, substantially as set forth, whereby the brakes may be applied and released and signals given by the use of a single column of air.

7. In combination with the port or barrel $P^2$ of the operating-cock of a railway fluid-pressure brake, a double valve arranged therein, and opened by different degrees or amounts of fluid-pressure, substantially as set forth.

8. A hollow piston-valve, $d$, having an air-port, $z$, of comparatively small area, arranged in and combined with the port or barrel $P^2$ of the operating-cock of a railway fluid-pressure brake, substantially as set forth.

9. The hollow piston-valve $d$, having a perforated head, $d^1$, for the balancing of such valve during the ordinary running of the train, in combination with escape-ports for destroying such balance when such valve is to be thrown wide open, substantially as set forth.

10. The stem $r'$, made with a flattened part, or equivalent port, along or opposite to its lower end, in combination with the bore in the piston-head $d^1$ in which it plays, and in combination with the piston-valve itself, and cock, port, or barrel $P^2$, in which all are arranged, whereby, on the upward stroke of the valve $d$, the escape into the chamber $c^1$ will be cut off while the reservoirs are being recharged, substantially as described.

11. The combination of the ports $c^2$, $c^3$, $g$, $g^1$, $g^2$, $g^3$, and $g^5$, substantially as and for the purposes set forth.

12. The combination of the sleeve $c$, piston-valve $d$, stemmed valve $e$, bored piston-head $d^1$, springs $e'$ $d^2$, stem $r'$, and port $z$, substantially as set forth.

In testimony whereof I have hereunto set my hand.

GEO. WESTINGHOUSE, JR.

Witnesses:
JAMES M. CHRISTY,
GEORGE H. CHRISTY.